United States Patent
Vellal et al.

(10) Patent No.: US 9,467,409 B2
(45) Date of Patent: Oct. 11, 2016

(54) SYSTEM AND METHOD FOR CONTEXTUAL MAIL RECOMMENDATIONS

(71) Applicant: Yahoo! Inc., Sunnyvale, CA (US)

(72) Inventors: Sainath Vellal, Karnataka (IN); Naveen Belkale, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 363 days.

(21) Appl. No.: 13/909,534

(22) Filed: Jun. 4, 2013

(65) Prior Publication Data

US 2014/0359480 A1   Dec. 4, 2014

(51) Int. Cl.
*H04L 12/58*   (2006.01)

(52) U.S. Cl.
CPC ..................................... *H04L 51/16* (2013.01)

(58) Field of Classification Search
CPC .............................. G06F 3/048; H04L 51/04
See application file for complete search history.

(56) References Cited

U.S. PATENT DOCUMENTS

2007/0143298 A1*   6/2007   Surendran et al. ............. 707/10
2009/0106375 A1*   4/2009   Carmel et al. ................ 709/206

* cited by examiner

*Primary Examiner* — Peiyong Weng
(74) *Attorney, Agent, or Firm* — James J. DeCarlo; Greenberg Traurig LLP

(57) ABSTRACT

An email system that enables users to request for and receive recommended messages which are relevant and contextually related to a received message via activation of a user interface element is disclosed. When a message is received, it is analyzed and keywords relevant to the received message along with named entities comprised in the received message are retrieved and stored. Upon activation of a user interface element, the relevant keywords are employed to retrieve other similar messages which are grouped into clusters. The clusters are further ranked based on their relevance to the received message and the top ranked messages from the most relevant cluster are selected for display to the user as the messages that are contextually relevant to the received message. The email system also facilitates execution of batch operations on the contextually relevant messages.

17 Claims, 12 Drawing Sheets

SYSTEM AND METHOD FOR CONTEXTUAL MAIL RECOMMENDATIONS

BACKGROUND

The Internet provides for instantaneous communications via various modalities such as email, voice and videos. Emails or electronic mail is system for exchanging messages via a digital communication network from one sender to one or more recipients. The messages exchanged by users are stored within the users' inbox, outbox, drafts, spam or other user created folders on an email server. Users may access their email accounts via various devices such as desktops, laptops, a tablet device or a smartphone. Generally one user is associated with each email account and the user may access information from the email account by complying with the security mechanisms implemented by the email system. As the users continue to employ their email accounts for communications, the information associated with such communication can accumulate in the various folders. Many email systems provide a search box for users to search for a specific email based on keywords that may be present in the subject line, sender's name, body of the email or other parts of an email message.

SUMMARY

This disclosure relates to systems and methods for contextual mail recommendations. A processor-executable method of retrieving and displaying contextually related messages is disclosed in an embodiment.

The method involves a processor receiving an email message addressed to an email account. When a user request for display of the received email message is received, the processor configures the display of the received email message to comprise at least one user interface element that facilitates a user to request for other messages in the email account that are contextually relevant to the received email message. The received email message and the user interface element are transmitted for display to the user. In an embodiment, the user interface element facilitates the user to request transmission of the contextually related messages in one or two gestures without the need for text or other input. For example, a tap or a click on the user interface element can result in retrieval of the contextually relevant messages. When the user interface element is thus activated, the processor proceeds with identifying messages in the user's email account that are contextually relevant to the received email message, the identification is based on relevant keywords extracted from the received message. The other contextually relevant messages are transmitted for display to the user. In an embodiment, the other relevant messages can comprise at least one message from a different thread than a thread comprising the received email. In an embodiment, the processor can facilitate execution of batch operations on the received message and a plurality of other contextually relevant messages. In an embodiment, the processor is configured to automatically recommend, search terms other than the relevant keywords that are relevant to the received email.

In an embodiment, identifying the plurality of other contextually relevant messages further comprises, analyzing, by the processor, the received email message and extracting the relevant keywords from the received email message. Other messages from the email account that also include the relevant keywords are retrieved and the similarity between the received email message and the other messages is determined to identify the other similar messages. In an embodiment, the similarity is determined by cosine similarity. The other relevant messages are clustered into a plurality of clusters based on the relevant keywords comprised within each of the other similar messages and the received email message. The plurality of clusters in are ranked, for example, in a descending order of relevance based on respective ones of the relevant keywords associated with each of the plurality of clusters and a first ranked cluster is selected as most relevant to the received email message. The messages within the first ranked cluster are further ranked based on respective similarities to the received message.

A computing device comprising a processor and a storage medium for tangibly storing thereon program logic for execution by the processor is disclosed in an embodiment. In an embodiment, the program logic comprises message receiving logic, executed by the processor, for receiving an email message addressed to an email account. Display request receiving logic is executed by the processor, for receiving a user request for display of the received email message. The processor also executes display configuring logic for configuring the display of the email message to comprise at least one user interface element that facilitates a user to request for other messages in the email account that are contextually relevant to the received email message. The received email message and the user interface element is transmitted for display to the user by the user interface transmitting logic executed by the processor. Element activation receiving logic, executed by the processor, receives a user activation of the user interface element and identifying logic, also executed by the processor, identifies other messages in the user's email account that are contextually relevant to the received email message, the identification is based on relevant keywords extracted from the received message. The other contextually relevant messages are transmitted for display to the user by message transmitting logic, executed by the processor.

In an embodiment, analyzing logic is executed by the processor, for analyzing the received email message and the relevant keywords are extracted from the received email message by extracting logic, executed by the processor. Other messages from the email account that also include the relevant keywords are obtained and the similarity is determined by the processor, between the received email message and the other messages to identify the other similar messages. Clustering logic is executed by the processor, for clustering the other similar messages and the received email message into a plurality of clusters based on the relevant keywords comprised within each of the other similar messages and the received email. Cluster ranking logic, executed by the processor, ranks the plurality of clusters in a descending order of relevance based on respective ones of the relevant keywords associated with each of the plurality of clusters and cluster selecting logic is executed by the processor, for selecting from the plurality of ranked clusters, a first ranked cluster as most relevant to the received email message. Message ranking logic, executed by the processor, ranks messages within the first ranked cluster based on respective similarities to the received email message and message selecting logic, executed by the processor, selects top 'A' messages of the first ranked cluster as the other contextually relevant messages, wherein A is a natural number. Term recommending logic, is executed by the processor, for transmitting to the user, search terms that are relevant to the received email message.

A computer readable storage medium comprising processor-executable instructions is disclosed in an embodiment. The instructions when executed by the processor cause the processor to receive an email message addressed to an email account and a user request for display of the received email message. The instructions also cause the processor to configure the display of the received email message to comprise at least one user interface element that facilitates a user to request for other messages in the email account that are contextually relevant to the received email message. The received email message and the user interface element are transmitted for display to the user. When a user activation of the user interface element is received by the processor, the instructions are provided for the processor to identify at least one other message in the user's email account that is contextually relevant to the received email message, the identification is based on relevant keywords extracted from the received email message in an embodiment. The at least one other contextually relevant message is transmitted for display to the user.

In an embodiment, the computer readable medium comprising instructions for identifying the at least one other message further comprise instructions that cause the processor to obtain other messages from the email account that also include the relevant keywords and determine similarity between the received email message and the other messages to identify other similar messages. The instructions for identifying the other similar messages further comprise instructions that cause the processor to cluster the other similar messages and the received email into a plurality of clusters based on the relevant keywords associated with each of the other similar messages and the received email message, rank the plurality of clusters in a descending order of relevance based on respective ones of the relevant keywords associated with each of the plurality of clusters, select from the plurality of ranked clusters, a first ranked cluster as most relevant to the received email message, rank messages within the first ranked cluster based on respective similarities to the received message and select top 'A' messages of the first ranked cluster as the at least one other contextually relevant message, wherein A is a natural number.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
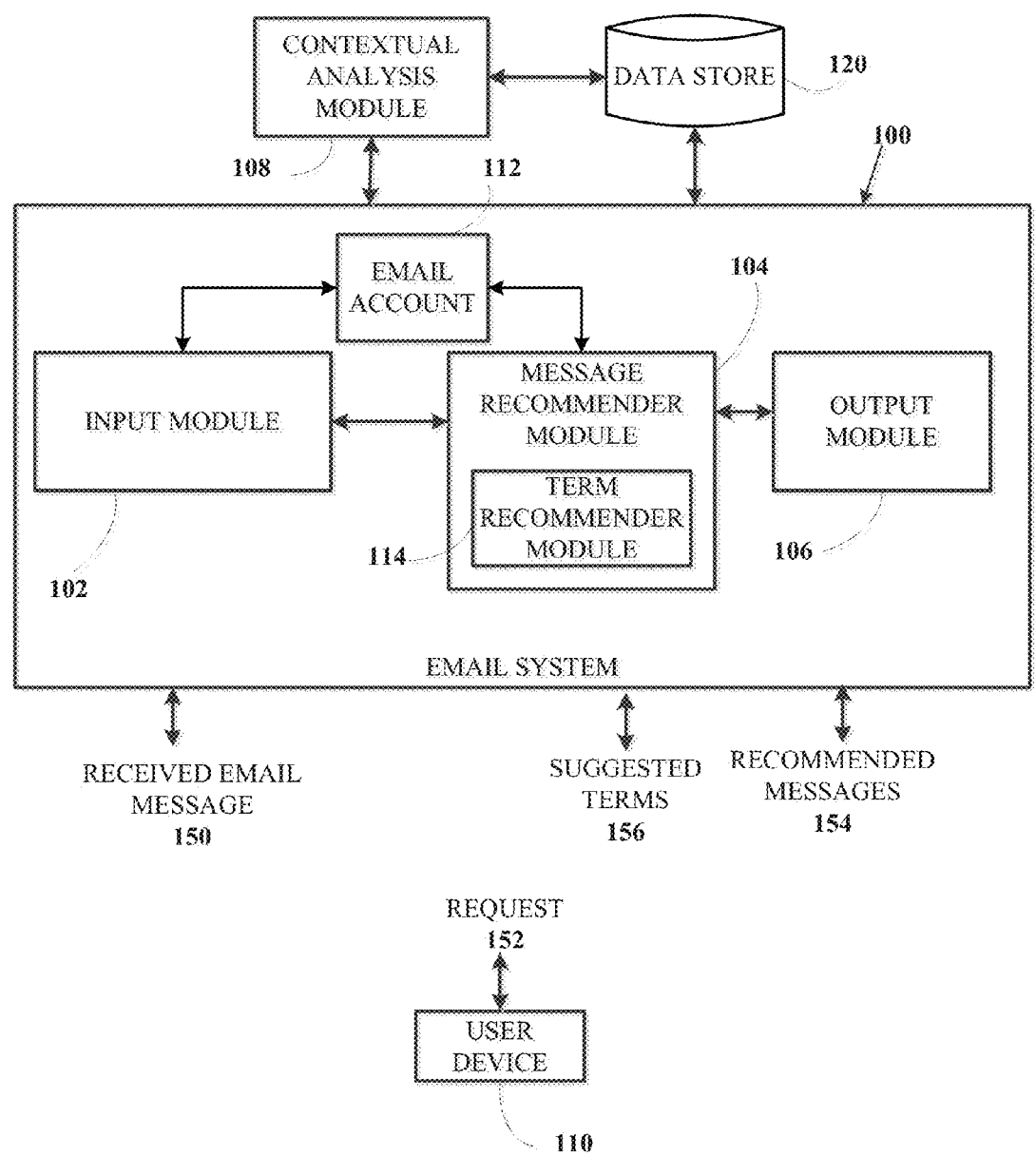
FIG. 1 shows a schematic diagram an email system in accordance with an embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Email systems are employed by individuals and commercial organizations alike for quick exchange of information. Various types of information such as text files, images, audio and even video may be exchanged via email messages. Some email systems incorporate enhanced security features to protect email accounts from being accessed by unauthorized users. For a particular user account, the email messages received by the user are stored in the user's inbox while those sent by the user are stored in the user's outbox. In addition, those messages that are being prepared by the user and are yet to be sent are stored in the user's 'draft' folder. In addition to the default folders provided by an email system, the users may also define custom folders to store emails based on various criteria. Such categorization helps users quickly identify any messages within their folders easily. Some email systems organize messages into clusters or threads showing continuity in communications exchanged on a particular subject or with a particular user, on a particular date or other criteria. In either case, if a user desires to view a particular message or a cluster of messages, the user needs to explicitly search for the desired message via one of the access mechanisms such as a search box generally provided by the email systems. The access mechanisms described supra fail to provide users automatically with email messages from various folders that are contextually relevant or related to a given message being accessed by a viewer.

Additionally, the use of smartphones, tablet computers, and other email enabled mobile devices, has made it possible for users to access and organize their emails from anyplace they may be located. However, with the shortcomings of the email systems described above and the limitations of the mobile devices such as smartphones make it difficult for users to retrieve relevant messages. This is because the email system described supra requires explicit input, such as a search query, from the user to search for particular messages and the mobile devices provide limited functionality to the user to provide such input. For example, smartphones have tiny keyboards which are not very convenient for keying in text input. Although voice recognition systems are included in smartphones, their use can also be limited, for example, in outdoor environments or other locations with high background noise. Hence, an email system that automatically identifies and displays relevant messages to a user with minimal user gestures can be especially useful in a world where mobile devices are increasingly being used to access email communications.

Various embodiments disclosed herein relate to enriching a user's experience with an email system by identifying and providing to the user, other email messages that are contextually relevant or related to the message that the user may be currently viewing. The embodiments also facilitate the user to execute various batch actions on the grouped messages such as but not limited to placing them into a particular email folder, classifying the messages into a specific category, or deleting them. In addition, intelligent topic extraction from an email message currently being viewed is also facilitated to aid further mail navigation based on extracted topic similarity, for example, via suggesting the extracted topics as search terms. As the information in each user's email account is unique, the results generated from the contextual searches detailed herein will also be user-specific and hence personalized to the user's needs and preferences. Moreover, the generation of contextual results does not require explicit user input thereby making it ideal for mobile devices such as, cellular phones, smartphones or tablet computers.

FIG. 1 shows a schematic diagram an email system 100 in accordance with an embodiment. The email system 100 comprises an input module 102, a message recommender module 104 and an output module 106 in accordance with an embodiment. The email system 100 facilitates exchange of electronic messages between numerous users wherein the input module 102 is configured to receive the email messages addressed to the users. The messages received for the various users that are identified based on the user ids included in the recipients field of the messages are directed to respective users' email accounts for storage by the input module 102. Each user of the email system 100 has a unique id and password that allow the user to log into his/her respective email account to receive and send messages. In an embodiment, the email system 100 is stored in a processor readable storage medium such as, for example, data store 120 and can be executed by a processor comprised within a computing apparatus.

Upon receiving a message 150 addressed to a user account 112, the input module 102 can be configured transmit it to the contextual analysis module 108 in accordance with an embodiment. The contextual analysis module 108 is configured to analyze the received message 150 obtain data such as keywords, named entities and other terms of that may of interest to the user and metadata related to such data can also be derived from the received message 150. For example, the contextual analysis module 108 can also determine respective fields of the received message 150 that particular terms/keywords occur. In an embodiment, the contextual analysis module 108 can be configured to store the recognized keywords/named entities of the received message 150 in the data store 120. The data store 120 can be a non-transitory, processor readable storage medium in accordance with embodiments described herein. It may be appreciated that the contextual analysis module 108 is shown as being external to the email system 100 only by the way of illustration and that the contextual analysis module 108 can also be comprised within the email system 100 in accordance with one embodiment.

In an embodiment, the input module 102 is configured to receive a further user input indicating the user's desire to view other messages in the email account 112 that are contextually related to the received email message 150. By the way of illustration and not limitation, other messages from the user's inbox, sent, drafts or other system-default or user-defined folders that include subject lines or message bodies with identical, synonymous or otherwise semantically related keywords, or which include the same or related named entities included in the received email 150, or which are received from the same sender as the received message 150 can be considered as contextually related messages. In this embodiment, when a user selects to view an email message 150 received at an inbox in an email account 112, the received email message 150 can be configured by the email system 100 to be displayed on the user device 110 with a widget (not shown) such as a tab, a button, a shortcut associated with a keyword associated with the received message 150 or other user interface element. The user interface element facilitates the user to request for other messages in the user's email account that are contextually related to the received message 150. In an embodiment, activation of the widget/user interface element displayed on a screen to a user causes a user device 110 to transmit a request 152 to the email system 100 for display of other contextually-related messages from the email account 112 which is a recipient of the received message 150.

In response to the user request 152, the message recommender module 104 transmits a request to the contextual analysis module 108 for the relevant keywords 154 and related metadata that was obtained from the received message 150 and saved to the data store 120. The contextual analysis module 108 readily retrieves the stored relevant keywords 154 and transmits them to the message recommender module 104. In an embodiment, the contextual analysis module 108 can also transmit the stored metadata associated with the relevant keywords 154. Based on the data and metadata input from the contextual analysis module 108, the message recommender module 104 identifies a subset of the messages from the email account 112 that are contextually related to the received message 150. Thus, minimum input from the user involving simple gestures such as a tap on the screen of the user device 110 or a click of a mouse button associated with the user device 110 can act as an implicit query that triggers the email system 100 to execute a search for the contextually related messages. This saves the user the time and effort of determining an appropriate query and keying in the query to identify related messages. For example, if the received message 150 is related to a sale/discount from a merchant, activation of the widget by the user will cause the message recommender module 104 to select for transmission, other messages from other vendors or user contacts related to, for example, Christmas offers or deals. In an embodiment, the contextually related messages may have been received at various times and identified across threads and/or clusters and from the various folders such as but not limited to the user's inbox, sent, draft, spam or other user-generated folders of the email account 112.

In one embodiment, the message recommender module 104 may further comprise a term recommender module 114 that is configured to additionally suggest search terms 156 related to the received message 150 which terms the user can employ to execute another search for messages in the email account 112 associated with the selected suggestion. It may be appreciated that the search term recommender module 114 is shown as part of the message recommender module 104 only by the way of illustration and that the search term recommender module 114 can be external to the message recommender module 104. As described herein the suggested search terms 156 can comprise keywords related to the concepts in the received message 150 or named entities that are relevant to the received message 150.

The input from the message recommender module 104 comprising one or more of the related messages 154 and the suggested search terms 156 is forwarded to the output module 106 for transmission to the user device 110. In an embodiment, the related messages 154 and the suggested search terms 156 are ranked in a particular order and top 'N' terms, N being a natural number, are selected for transmission to the user device 110. Therefore, in response to the user input via the widget requesting display of the contextually related messages, the user device 110 receives and displays one or more of the related messages 154 and suggested search terms 156 to the user. In an embodiment, the related messages 154 and the suggested search terms 156 can be displayed simultaneously along with the received message 150 on the user device 110 by partitioning the available view into multiple panes. In an embodiment, a display of the received message 150 on the user device 110 can be replaced with another display showing one or more of the related messages 154 and suggested search terms 156.

Presentation of contextually related mail messages 154 as detailed herein also enables users to execute batch actions such as moving the messages 154 or a subset of the messages 154 to a particular folder, marking, deleting or reporting the messages. In this embodiment, the input module 102 is also configured to receive further user input associated with the related messages 154 in order to execute a user action on the related messages 154. This mitigates the need for the users to execute the desired action on each individual message.

Although the embodiments described herein refer to an email message, similar analysis can be applied to other types of messages stored in the email account 112. For example, the email account can store instant messenger messages and the related messages 154 can include such instant messages stored in the email account 112.

Figure 2:
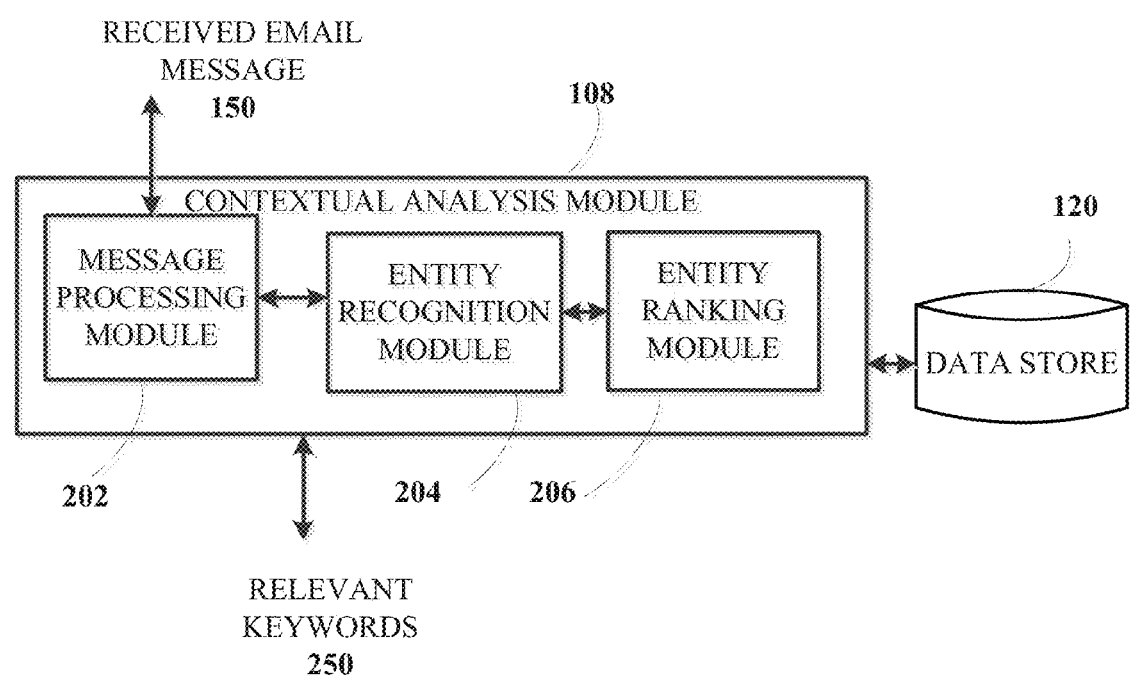
FIG. 2 is a schematic diagram showing the sub-modules of the contextual analysis module in accordance with an embodiment.

FIG. 2 is a schematic diagram showing the sub-modules of the contextual analysis module 108 in accordance with an embodiment. In response to initially receiving the message 150, the contextual analysis module 108 extracts relevant keywords and metadata related to such keywords from the message 150 to save it to the data store 120. The keywords relevant to the received message 150 and optionally their metadata thus collected by the contextual analysis module 108 is employed to find related messages within the email account 112 by the message recommender module 104 and the output module 106 transmits at least a subset of the determined relevant messages to the user.

A received message 150 obtained by the contextual analysis module 108 is initially processed and parsed by the message processing module 202 to obtain the various words in the message 150 along with their relevant context. The processing can involve recognizing discrete words in the received message 150, removing irrelevant words such as stop words, irrelevant punctuation, and associated metadata. The received email message 154 can comprise various portions such as fields for a sender's email address, one or more recipients' email address, the subject line and the message body. The text from the various fields including the message body is processed and parsed to obtain the keywords and related metadata. The metadata associated with the keywords which is obtained by the message processing module 202 can comprise without limitation, the position of the keyword in the received message 150, the number of occurrences of the keyword in the received message 150, the punctuation associated with the keyword or other words occurring with the keyword that provide a context to the keyword.

The keywords and related metadata output from the message processing module 202 can be transmitted to the entity recognition module 204. The metadata collected by the message processing module 202 can be used to determine the named entities within the received message 150 and their relevance to the received message 150. In an embodiment, the keywords can comprise without limitation any words in the received message 154 that may be of interest to the user. For example, the keywords can comprise, common nouns identifying objects, named entities such as nouns that represent concepts, e.g., environment, cycling, jogging trail, beautiful place, proper nouns identifying places, personalities, events, dates e.g., January first or combinations thereof. Thus, the entity recognition module 204 is configured to locate and classify atomic elements in text of the received message 150 into predefined categories such as but not limited to the names of persons, organizations, locations, expressions of times, quantities, monetary values, percentages. In an embodiment, the metadata associated with a given keyword, for example, the other words in the message around the keyword can be employed by the entity recognition module 204 to identify the named entities.

The named entities and keywords from the entity recognition module 204 are transmitted with the metadata to the entity ranking module 206. The entity ranking module 206, in an embodiment, ranks the received keywords/named entities, for example, in a descending order of their relevance to the received message 150 and identifies the top 'N' keywords as the keywords that are most relevant to the received message 150. A keyword may be determined to be more or less relevant to the received message 150 based on the metadata obtained by the message processing module 202. Criteria such as number of occurrences of the keyword in the message, a position of the keyword in the message such as whether the keyword occurs in the subject line or the message body, or both, or in one of the other fields such as the sender's email address field, or other recipients included in the received message 150 can be employed to determine the relevance of the keywords. Metadata indicating the punctuation or style of the keyword's appearance, for example, whether the keyword is italicized, has associated exclamation marks or is of larger size compared to the other text or other such features, can be used to determine the extent of its relevance to the received message 150. In an embodiment, the other words in the message around the keyword can be employed to determine the relevance of the keyword/named entity to the received message. The data output from the entity ranking module 206 is saved to the data store 120. Upon receiving the user request 152 for contextually relevant messages, the relevant keywords 250 determined by the entity ranking module 206 can be transmitted to the message recommender module 104 for the determination of relevant messages.

Figure 3:
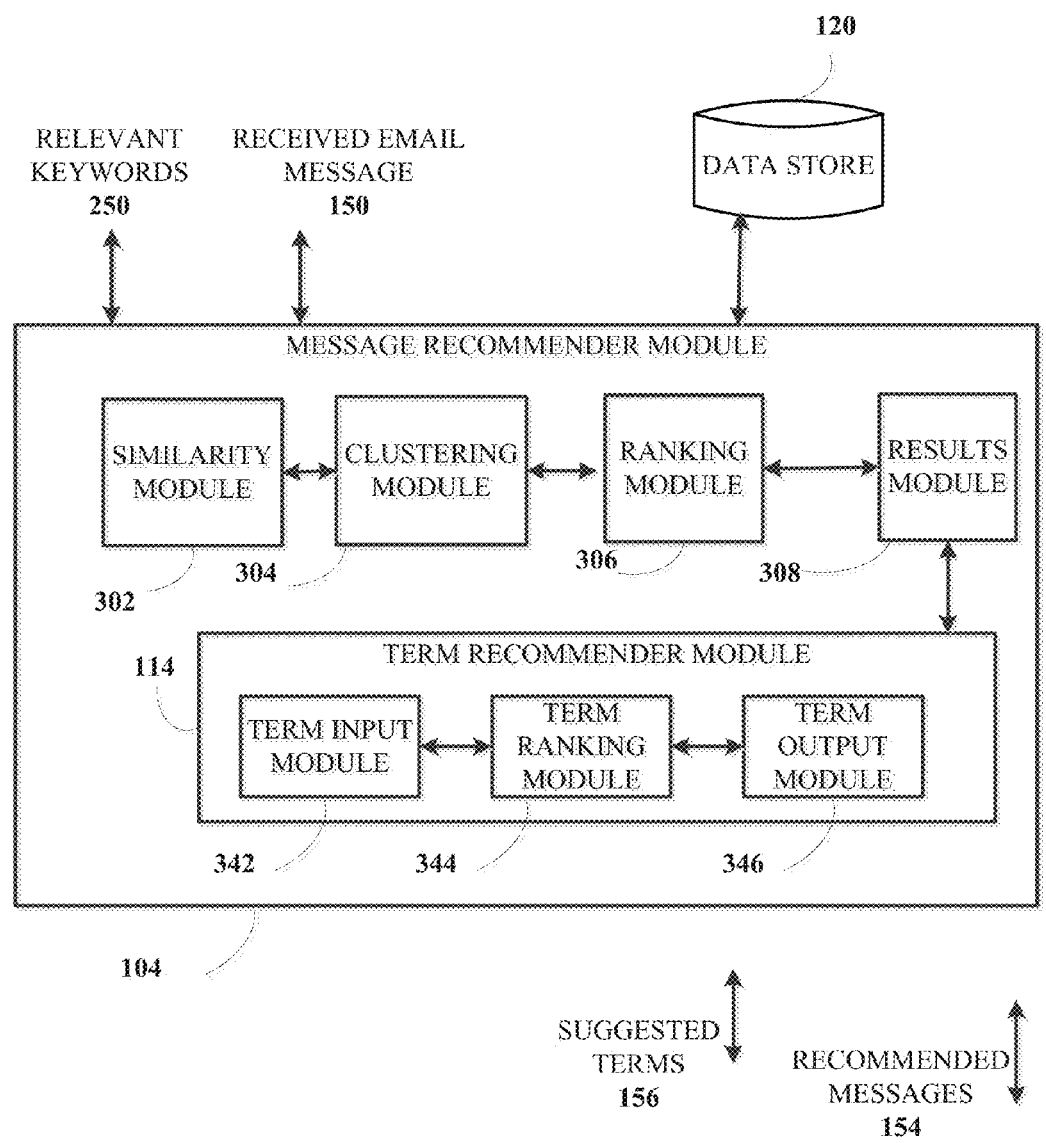
FIG. 3 is a schematic diagram of the message recommender module in accordance with one embodiment.

FIG. 3 is a schematic diagram of the message recommender module 104 in accordance with one embodiment. The message recommender module 104 receives the top 'N' relevant keywords 250 for the received message 150 and identifies other messages 154 in the email account 112 that are relevant to the received message 150 for transmission to the user. A similarity determination module 302 comprised within the message recommender module 104 employs the relevant keywords 250 to identify other messages within the email account 112 that are similar to the received message 150. In an embodiment, the similarity module 302 can determine similar emails via computing a similarity measure between the vectors representing the various email messages. In an embodiment, each of the email messages in the email account is represented by a vector in the universe of keywords. The components of each of the vectors are determined from the weights of the respective keywords/named entities associated with the messages. For example, if the entity ranking module 206 determines that the most relevant keywords 250 associated with received message 150 are "Christmas", "deals", "shopping", the received message 150 is represented by a vector with non-zero components for the most relevant keywords 250 while the remaining components are zero. Similarly, each of the received, sent, draft emails associated with the email account 112 are represented by vectors whose non-zero components are based on the respective relevant keywords determined by the contextual analysis module 108. In an embodiment, the contextual analysis module 108 stores the vector representations of the email messages in the data store 120 as a matrix whose values are determined by the value each keyword in the universe of keywords has for a given message. In an embodiment, if an email message includes attachments, then such documents can also be represented as vectors and their weight can be factored into the weight of the particular message to which they are attached while determining the relevance of the particular message to the received message 150.

The vectors representing the messages of the email account 112 can be accessed by the similarity module 302 for determining the other messages that are similar to the received message 150. The similarity module 302 is configured to determine other similar emails based on the similarity between the vectors representing the received message 150 and each of the other email messages in the email account 112. Various know similarity measures can be employed by the similarity module 302 for the distance determination. By the way of illustration and not limitation, the similarity module 302 can employ cosine similarity for the similarity determination. For two vectors A and B respectively representing the received message 150 and one other message from the email account 112, the cosine similarity can be determined as similarity=|A·B|/(‖A‖ ‖B‖). The similarities are arranged, for example, in an ascending order and the messages associated with top 'X' ('X' representing a natural number) closest vectors are selected as being similar to the received message 150. In an embodiment, 'X' can either be specified by a user such as a programmer or can be automatically determined by a computing apparatus executing the email system 100. In an embodiment, the vectors representing the messages in the email account 112 can be pre-calculated at the time a particular message is received or in a routine batch operation and stored in the data store 120 for future use.

The similar emails obtained by the similarity module 302 can be transmitted to or are accessed from the data store 120, by the clustering module 304 in order to group related emails to facilitate execution of batch operations such as marking, organizing, moving, deleting or reporting the related emails. In an embodiment, the clustering module 304 runs semantic analysis on the similar email messages from the similarity module 320 in order to group related email messages together. In an embodiment, the clustering module 304 groups related email messages from across various message threads obtained at different times, having various subject lines, and received from different sources. In an embodiment, the grouping of the related emails from the similar emails can involve semantic analysis based on LDA (Latent Dirichlet Allocation) or LSA (Latent Semantic Analysis) to identify relations amongst terms/keywords/concepts within the similar email messages. The similar emails are grouped into a plurality of clusters based on the affinity of their respective vectors for topics corresponding to each cluster. For example, the received message 150 comprises keywords "Christmas", "deals" and "shopping" whereas one of the similar messages from the similarity module 302 comprises "shopping" and "holidays" while another one of the similar messages can comprise "Christmas" and "greetings". The clustering module 304 is configured to run semantic analysis on the similar messages and identify at least two clusters one of which corresponds to the message(s) related to the Christmas greetings and another cluster related to message(s) associated with holiday shopping.

In an embodiment, the clustering module 304 is configured for running multiple iterations through the similar messages and to extract greater number of direct and/or transitive dependencies in each of the iterations. It may be appreciated that greater number of iterations will result in identifying greater number of dependencies. The number of iterations can be dynamically adjusted by the clustering module 304 based on various factors such as, the number of similar mails and consequently the number of dependencies to analysis and/or the number of clusters to generate and the latency occurring in the email system 100 due to the clustering operation.

The output from the clustering module 304 is accessed by the ranking module 306 which ranks the plurality of clusters based on their relevance to the received message 150. In one embodiment, the metadata associated with the keywords can be applied to determine the relevance ranking of the clusters. For example, the contextual analysis module 108 can provide metadata identifying that Christmas time is also referred to as holiday season in some parts of the world to the message recommender module 104. Based on such input, the ranking module 306 can rank the cluster associated with "holiday" and "shopping" higher than the cluster associated with "Christmas" and "greeting", since "holiday shopping" is a more relevant to the received email 150 which relates to Christmas deals as opposed to an email associated with Christmas greetings. In an embodiment, the ranking module 306 can be further configured to similarly rank emails within a most relevant cluster based on their relevance to the received email 150. Thus, the ranking module 304 outputs a set of ranked clusters wherein each cluster of the plurality of clusters comprises vectors representing very closely related email messages from amongst the similar emails associated with the email account 112. In an embodiment, the ranking module 304 can be further configured to rank messages within a top ranked cluster based on their relevance/similarity to the received message 150.

The output from the ranking module 306 is accessed by the results module 308 to generate results comprising recommended messages 154. In an embodiment, the results module 306 is configured to select the top 'A' (A being a natural number) messages from the top ranked cluster/most relevant cluster to be presented as the recommended messages 154 to the user. In an embodiment, the number of recommended messages to the user 'A' can be predetermined by the email system 100. In an embodiment, the number of recommended messages 'A' can be determined dynamically by the email system 100, based for example on user habits. In an embodiment, if the top ranked cluster has less than 'A' messages, additional top messages from the next ranked cluster can be forwarded to the user by the results module 308. In alternate embodiments, the results module 308 can be configured such that the 'A' results shown to the user comprise without limitation, a top ranked message from each of the plurality of top 'A' clusters. The output module 106 transmits the results for display to the user on the user device 110. The generation and transmission of relevant email messages in accordance with embodiments described herein facilitate users to view other messages that are contextually related to a given email message automatically with simple input such as a tap on a touchscreen without having to type in any query. Hence it is very useful for devices such as smartphones or tablet computers wherein it can be time consuming for the user to input a text query.

In one embodiment, the term recommender module 114 comprises a term input module 342 that can be configured to access the recommended messages 154 identified by the results module 308 prior to their transmission to the user. The term input module 342 can be additionally configured to access the keywords associated with the recommended messages 154, for example, from their associated metadata in the data store 120 and identify a subset of the keywords from the data store 120 that are not already included in the relevant keywords 250. The term ranking module 344 is configured to rank the subset of keywords in terms of their relevance to the received email message 150 in accordance with embodiments described herein. For example, keywords/named entities that are synonymous or similar to the relevant keywords 250 or those that occur in similar context as the relevant keywords 250 or even antonyms that are generally known to occur with the relevant keywords 250 can be identified and ranked as being more relevant to the received email message 150. In an embodiment, the term ranking module 344 can rank the subset of keywords identified as being relevant to the received email message 150 in a descending order of their relevance. A term output module 346 can be configured to select a finite number of the top ranked keywords from the descending order as suggested terms 156 for transmission to the user by the output module 106.

Figure 4:
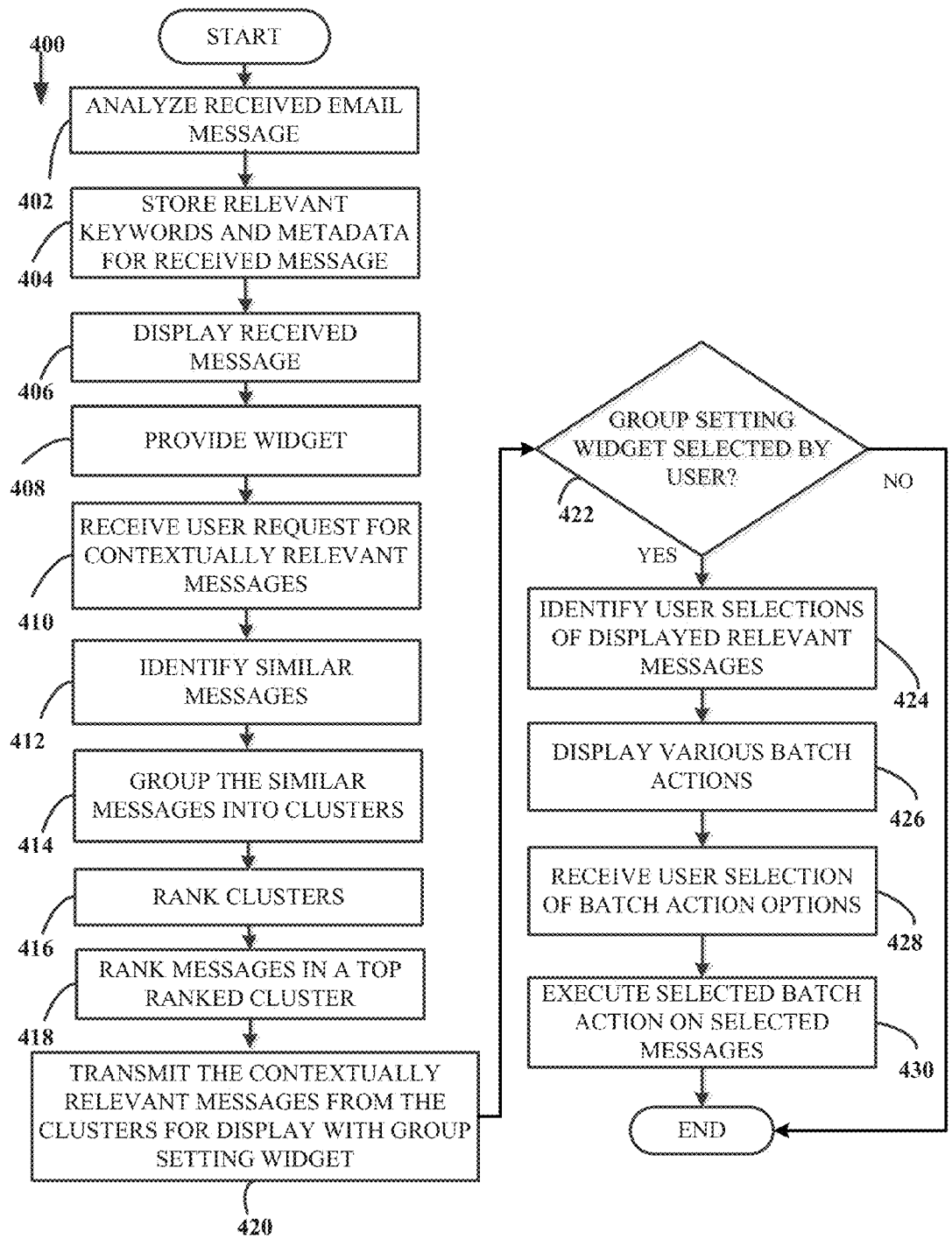
FIG. 4 shows a flowchart that details a method of displaying messages from an email account that are contextually relevant to a given message in accordance with one embodiment.

FIG. 4 shows a flowchart 400 that details a method of displaying messages from an email account 112 that are contextually relevant to a given message in accordance with one embodiment. The method begins at 402 wherein a message 150 received at the email account 112 is analyzed by the contextual analysis module 108 in accordance with embodiments described herein to obtain the relevant keywords and associated metadata. The keywords and associated metadata is stored as shown at 404 and the received email message 150 is displayed to the user at 406, for example upon the user logging in to the email account 112. As described supra, the email system 100 is configured to provide a widget at 408 with the received email message 150 to the user in order to facilitate the user to request display of the contextually relevant messages without any text input but via a simple gesture such as a tap on a touchscreen or a click of a mouse button. At 410, a user request 152 is received for display of other messages from the email account 112 that are contextually relevant to the received email message 150 upon the user activation of the widget. In an embodiment, the user request 152 can cause the email system 100 to transmit one or more of the relevant keywords 154 for display to the user in a selectable format so that selection of one of the keywords can cause the email system to transmit for display, the messages associated with the selected keyword as the most relevant messages 154.

At 412, other messages from the email account 112 that are similar to the received email message 150 are identified. It may be appreciated that the methods described herein for determination of message similarity should not be construed as limiting and that any known method or a method that is to be invented for identifying similar messages/text input can be employed in accordance with the embodiments described herein. At 414, the similar messages are further grouped to form clusters of more closely related messages. For example, the similar messages can be further grouped into a plurality of clusters wherein each message of a cluster is relevant to a topic associated with the cluster. The plurality of clusters are ranked in accordance with their relevance to the received message at 416. In an embodiment, the plurality of clusters can be ranked in a descending order of their relevance to the received email message 150 such that it may be determined that the messages from the top ranked cluster are most relevant to the received email message 150. The messages in a top-ranked cluster or the most relevant cluster are further ranked at 418 in order of their relevance to the received email message 150. At 420 the most relevant messages from a most relevant cluster are transmitted for display to the user. This facilitates the user to execute batch actions on the most relevant messages. In one embodiment, only the sender, subject line and a receipt date/time of the relevant messages 154 as seen in an inbox associated with the email account 112 can be displayed on a screen of the user device 110. In an embodiment, the display on the user device can also include the first few lines of the relevant messages 154 in addition to the aforementioned message details.

In an embodiment, the relevant messages that are transmitted to the user can be configured for display with a group setting widget that facilitates execution of various batch actions on selected ones of the displayed messages. In an embodiment, the group setting widget can be a button, a link or other user interface element that facilitates receiving input indicative of user intentions. Various batch actions such as move to folder, delete, categorize or other actions can be performed in accordance with embodiments described herein. Accordingly at 422, it is determined if the user selected the group setting widget. If it is determined that the group setting widget is not selected, the process terminates on the end block. If it is determined that the group setting widget was selected by the user, the user selected ones of the displayed relevant messages for execution of batch actions thereon are received at 424. At 426, a user interface showing various batch actions that can possibly be executed on the selected relevant messages is transmitted for display to the user. At 428, one of the displayed options for a batch action that is selected by the user is received and at 430 the corresponding batch action is executed on the selected messages. In an embodiment, the user can be notified to select one or more messages or one of the batch actions if none are selected.

Figure 5:
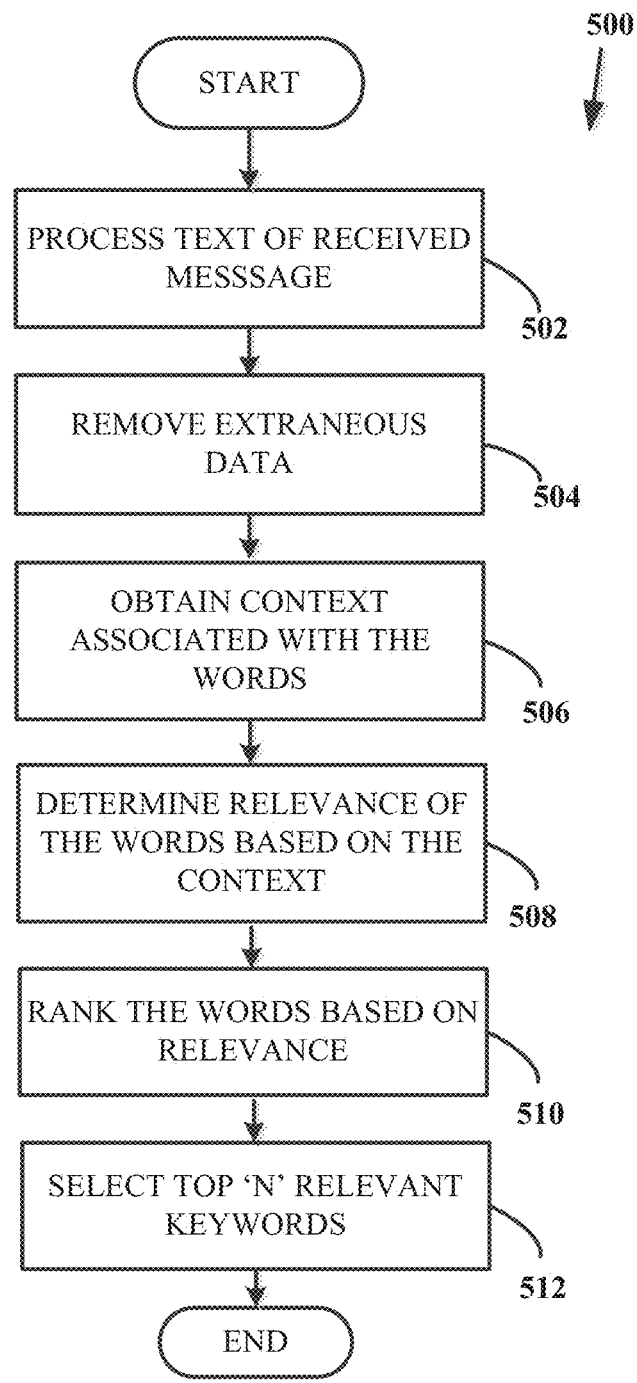
FIG. 5 is a flowchart that details a method of processing a received message to identify relevant keywords in accordance with an embodiment.

FIG. 5 is a flowchart 500 that details a method of processing a received email message 150 to identify relevant keywords 250 in accordance with an embodiment. The method begins at 502 wherein the text of the received message is processed to obtain discrete elements. For example, the text is analyzed to obtain discrete words, punctuation, spaces or other elements included in the received email message 150 such as images. The extraneous data which is not required for relevant message identification such as stop words, punctuation, spaces and similar elements are removed at 504. The context associated with the remaining words/keywords/named entities of the message is obtained at 506. As described supra, the context of a keyword can be determined based on a combination of factors which can include without limitation, the number of times a keyword occurs in the received email message 150, the position of occurrence of the keyword, the style of the appearance of the keyword or other words/punctuation that precedes or follows the keyword. The relevance of the keywords to the received message is determined at 508 based on the context of the keywords as determined at 506. The keywords are ranked at 510 in order of their relevance to the received email message 150 as determined at 508. In one embodiment, the keywords can be ranked in a descending order of relevance so that the top ranked keyword is the keyword or named entity that is most relevant to the received email message 150. At 512, the top 'N' ranked keywords are thus selected as being relevant to the received message 512.

Figure 6:
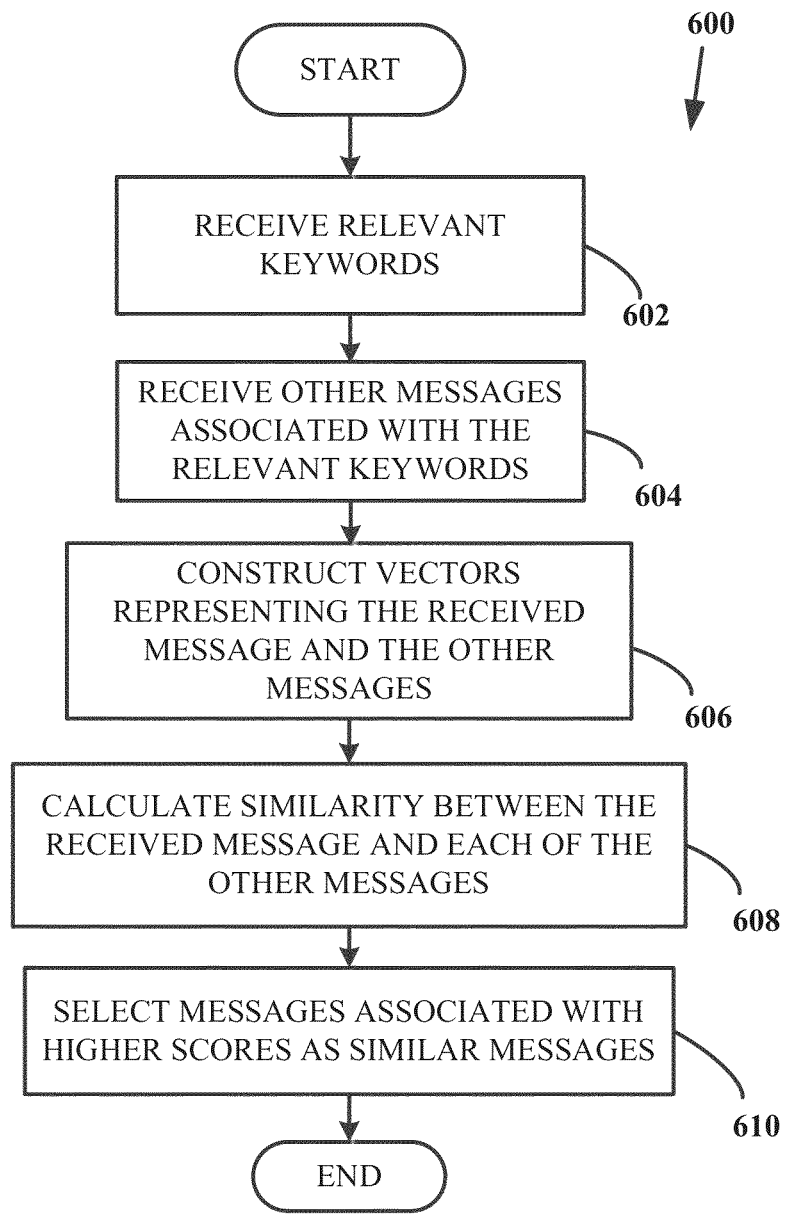
FIG. 6 is a flowchart that shows a method of determining other messages in the email account that are similar to a received message in accordance with an embodiment.

FIG. 6 is a flowchart 600 that shows a method of determining other messages in the email account that are similar to a received email message 150 in accordance with an embodiment. The method begins at 602 wherein the relevant keywords 250 are received from the contextual analysis module 108. At 604, other messages from the email account 112 associated with the relevant keywords 250 are retrieved. For example, the other messages can comprise the relevant keywords 250 or the context data associated with the other messages can indicate that the association of the other messages with the relevant keywords 250. Vectors representing the received email message 150 and the other retrieved messages are built at 606. In an embodiment, the vectors are pre-calculated in a batch operation and stored in the data store 120. In one embodiment, the vectors have non-zero components for the relevant keywords 250 and the magnitude of the non-zero components of each vector indicates the degree of relevance of respective keywords to a message represented by the vector. At 608, the similarity between the received email message 150 and each of the other messages can be estimated by employing measures such as cosine similarity. In an embodiment, the cosine similarity measure value can range from 0 to 1, wherein a higher value indicates a greater match and a value of 1 indicates that the messages represented by the two vectors are identical. Accordingly, the similarity scores can be arranged in a descending order and at 610 those messages with high scores are selected as messages similar to the received email message 150.

Figure 7:
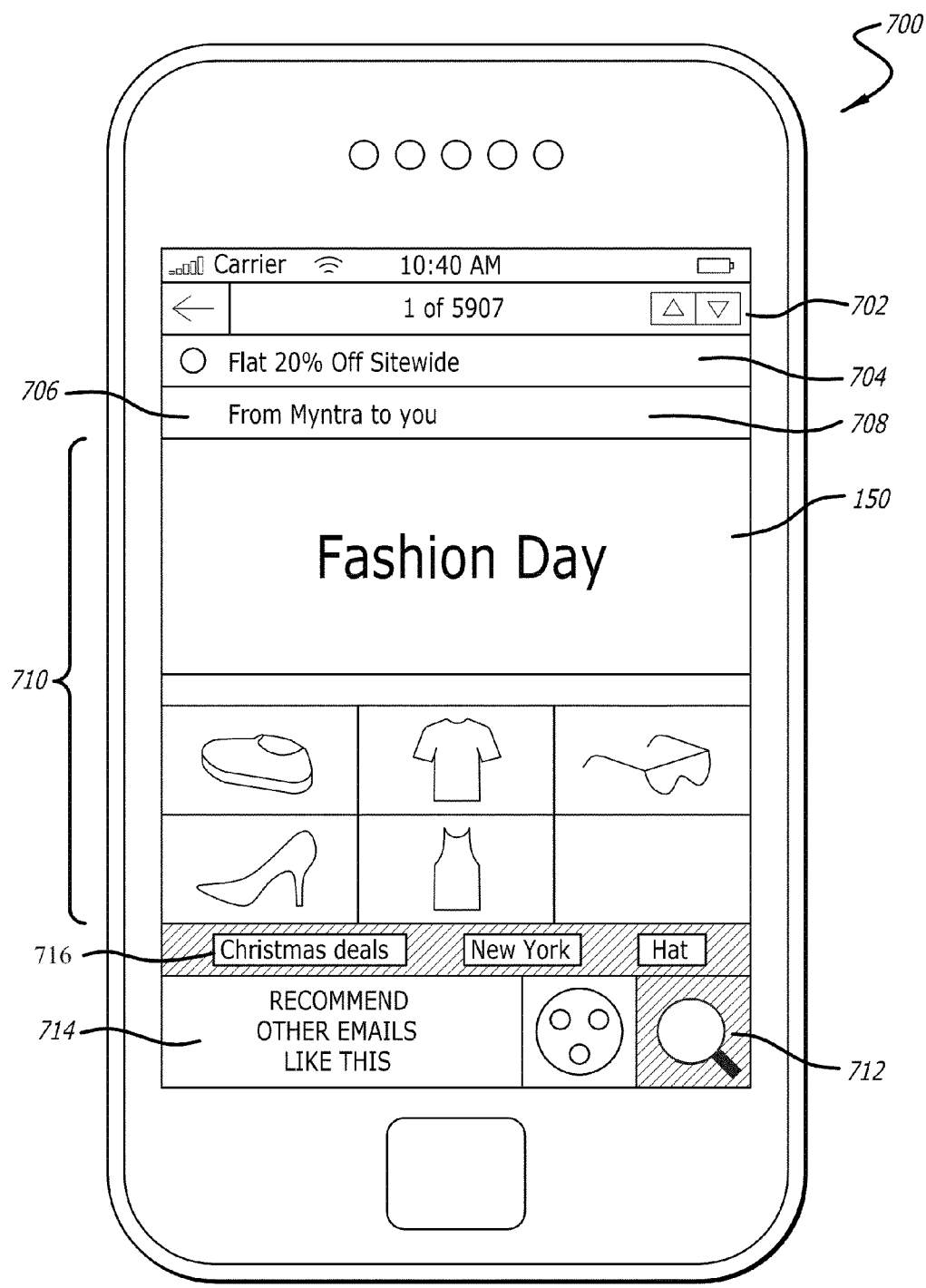
FIG. 7 shows a schematic diagram of a user interface for receiving a user request in accordance with one embodiment.

FIG. 7 shows a schematic diagram of a user interface 700 for receiving a user request in accordance with one embodiment. It may be appreciated that the user interface 700 is only shown herein by the way of illustration and not limitation and that other user interfaces can be employed with the email system 100 for displaying contextually relevant messages from an email account 112 in accordance with embodiments described herein. A received email message 150 associated with the email account 112 is shown on a display 702 of the user device 110. By the way of illustration and not limitation, the display includes fields such as the subject line 704 of the message, the sender information 706 the recipient information 708 and the message body 710. In addition, the display includes one or more widgets or user interface elements like the magnifying glass 712, or search button 714 which when clicked by the user facilitate transmitting the request 152 to the email system 100. In an embodiment, clicking/tapping on the magnifying glass 712 causes a floating strip 716 of keywords extracted from the received email message 150 to be displayed above the search button 714. The floating strip 716 presents keywords in a user selectable format so that when one of the keywords on the floating strip 716 is selected the email system 100 executes a search for the other relevant messages associated with the selected keyword.

Figure 8:
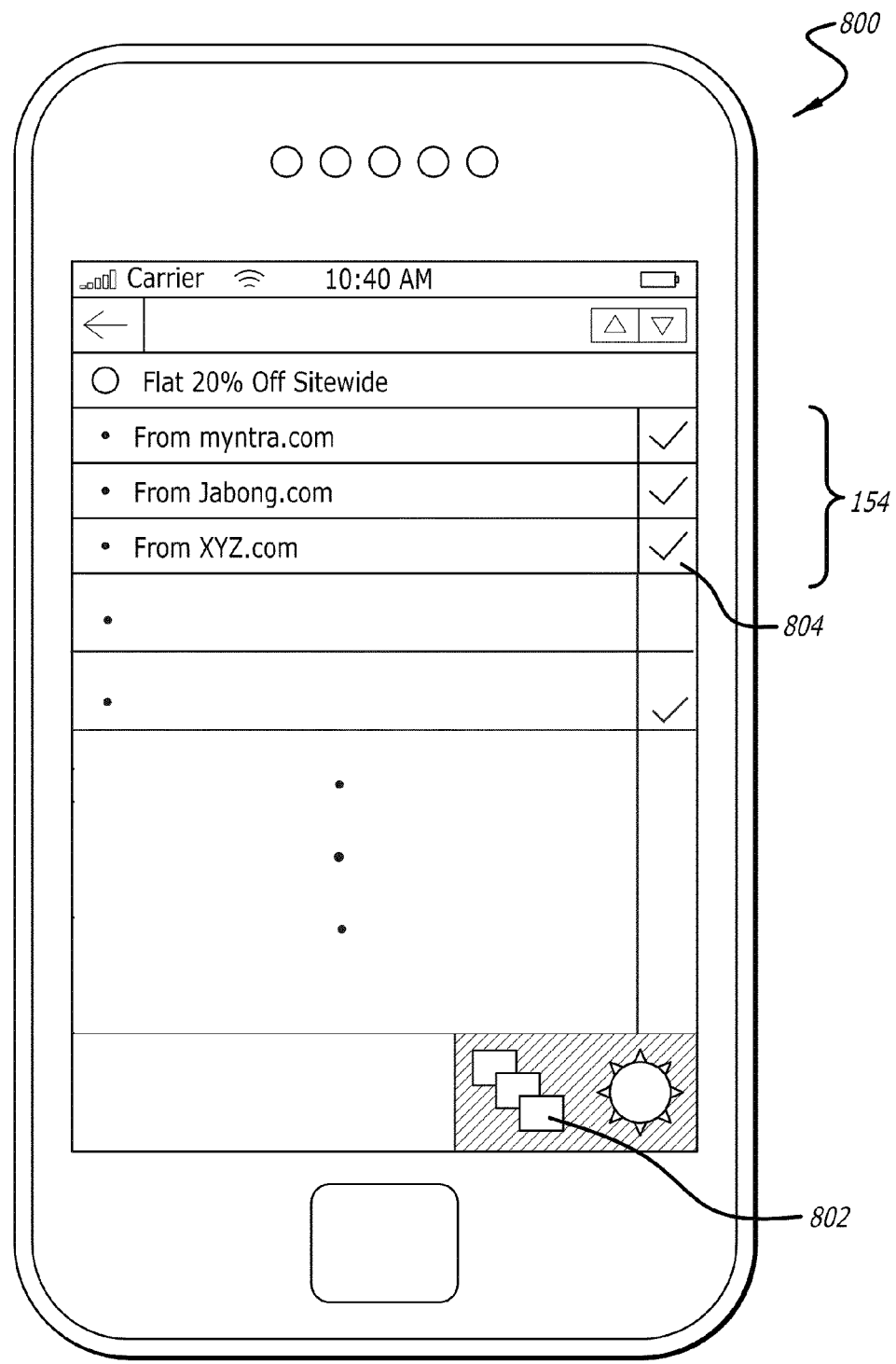
FIG. 8 shows a schematic diagram of a display presented to the user which comprises relevant email messages in accordance with one embodiment.

FIG. 8 shows a schematic diagram of a display 800 presented to the user which comprises relevant email messages in accordance with one embodiment. When the user clicks one of the user interface elements 712, 714 or one of the keywords from the floating strip 716, the relevant messages 154 from the email account 112 are determined in accordance with embodiments described herein per the selected option and displayed to the user. The user interface elements 712, 714 and 716 thus do not require any particular text input from the user. Rather an activation or selection of one of the user interface elements 712, 714 and 716 via a single user gesture such as a tap or click causes the email system 100 to execute a search for contextually relevant messages 154 in the email account 112 in accordance with embodiments described herein. In addition, a group setting button 802 that enables a user to execute batch actions on the relevant emails 154 is also displayed. Another user interface element such as check box 804 can also be provided for each of the relevant messages 154 in the display 800 to select or deselect particular ones for the batch actions that is executed when an action associated with the group selection button 802 is triggered.

Figure 9:
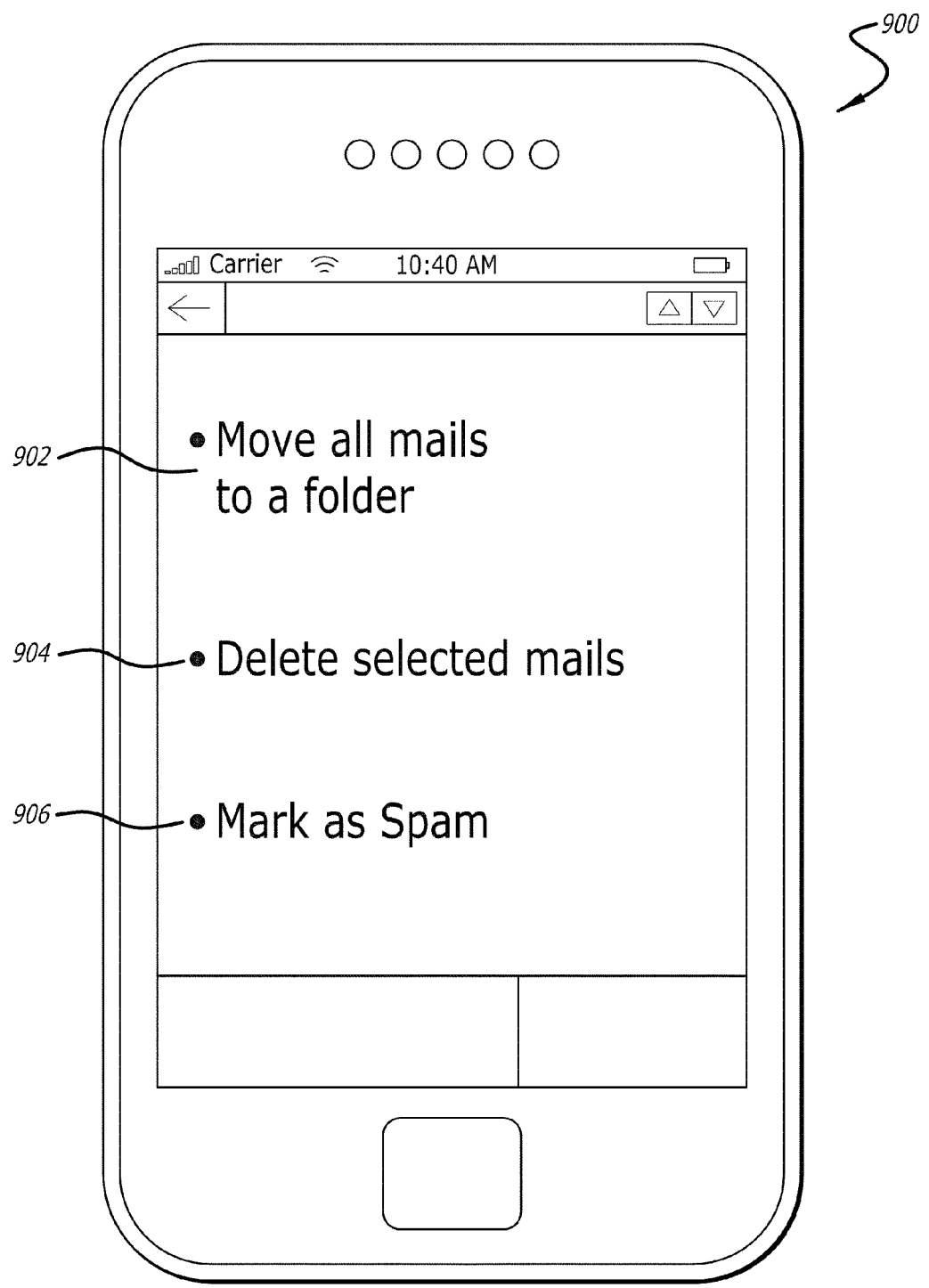
FIG. 9 shows a schematic diagram of a user interface that is displayed when the user clicks the group setting button in accordance with one embodiment.

FIG. 9 shows a schematic diagram of a user interface 900 that is displayed when the user clicks the group setting button 802 in accordance with one embodiment. The user interface 900 shows various batch actions that can be executed on the relevant messages 154. As described supra, one or more of the relevant messages 154 can be selected for execution of one of the batch actions shown on the user interface 900. When of one of the displayed options is selected by the user, it causes execution of the associated batch action on the selected ones of the relevant messages 154. It may be appreciated that the various options such as move all mails 902, delete related mails 904, mark as spam 906 are only shown herein by the way of illustration and that other batch actions for the relevant messages 154 can also be included in the display.

Figure 10:
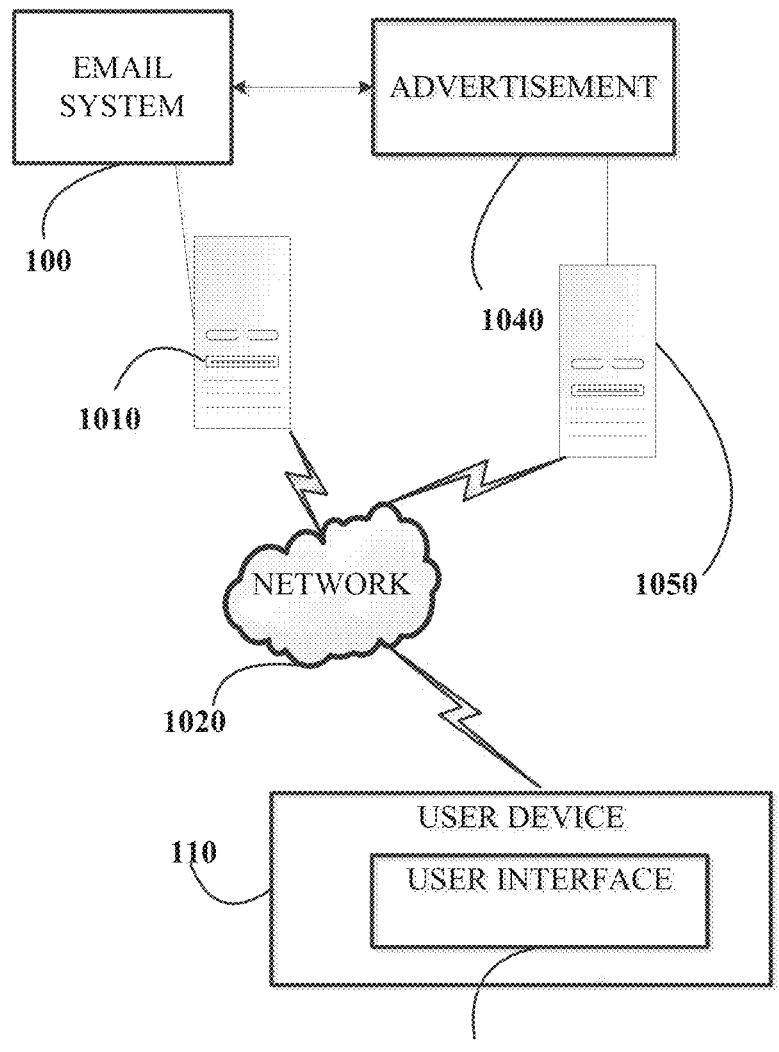
FIG. 10 illustrates a schematic diagram of a network comprising an email system being accessed by a user device in accordance with embodiments described herein.

FIG. 10 illustrates a schematic diagram of a system 1000 for identifying and displaying relevant emails from a user's email account 112 in accordance with embodiments described herein. The system 1000 includes a client/user device 110 employed by a user for accessing the email system 100. The user device 110 transmits a request for access to the email system 100 via a network 1020, such as one or more of the Internet or a cellular network, to a server 1010. It may be appreciated that only one user device 110 is shown for illustrative purposes and that any number of devices of different types including mobile devices such as smartphones, tablet computers, laptops or stationary devices such as desktops can access the email system 100, request for and retrieve relevant emails in accordance with embodiments described herein. The server 1010 that hosts the email system 100 receives the request and transmits a webpage or user interface 700 for display at the user device 110. In an embodiment, the user interface 700 can include multiple screens to show the various user requested information such as relevant emails, clustered emails for batch actions or suggested keywords. In an embodiment, a single screen may comprise multiples view panes each showing the requested information. Thus, the relevant emails or keywords or clustered groups of messages can be shown simultaneously with the received email 150 in an embodiment. The user interface 700 thus facilitates the various interactions of the user with the email system 100 in accordance with embodiments described herein. In an embodiment, the user interface 700 can also include one or more advertisements 1040 retrieved from an ad-server 1050.

Figure 11:
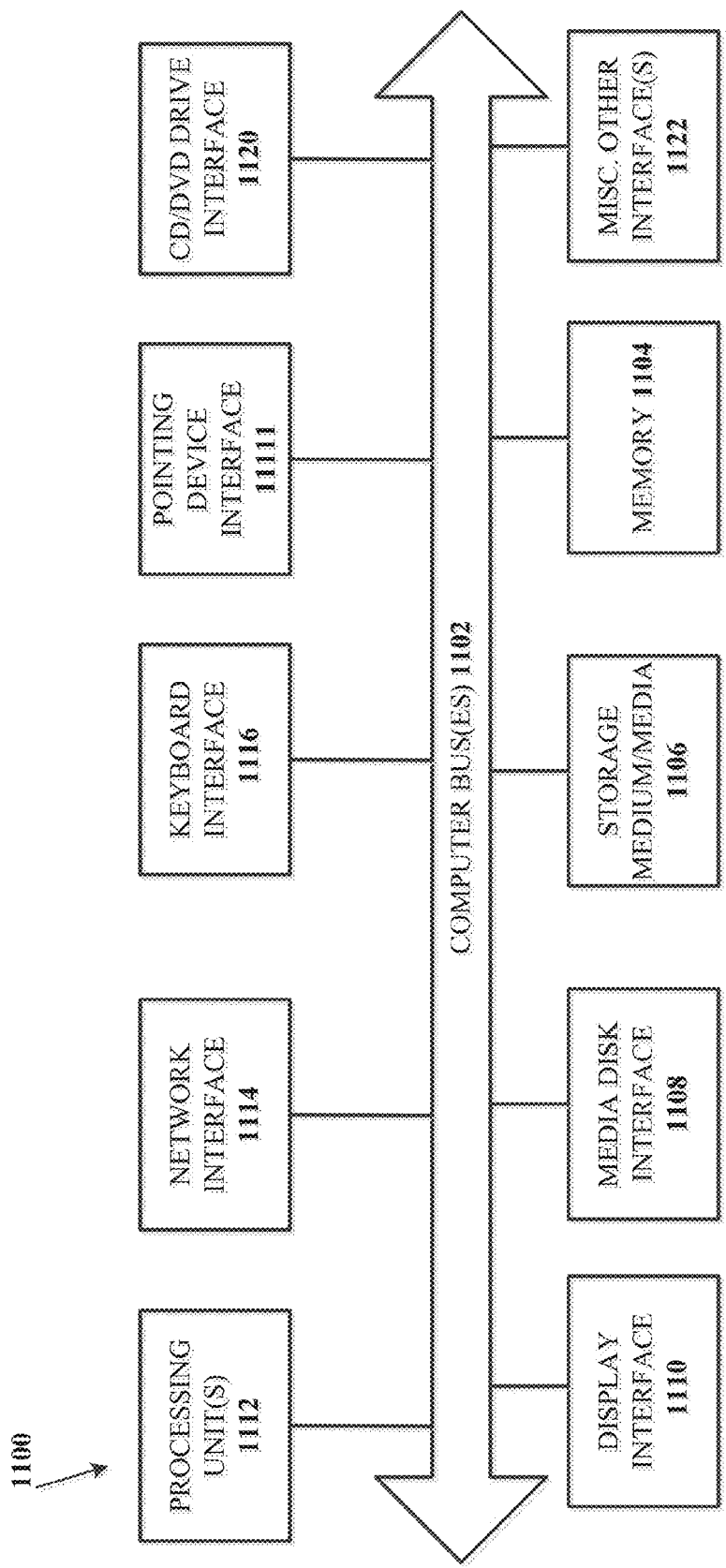
FIG. 11 illustrates internal architecture of a computing device in accordance with embodiments described herein.

As shown in the example of FIG. 11, internal architecture of a computing device 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code or logic, and/or computer-executable process steps, incorporating functionality described herein, e.g., one or more of process flows described herein. CPU 1112 first loads computer-executable process steps or logic from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, metadata, playlists and other files. Persistent storage medium/media 1106 can further include program modules and data files used to implement one or more embodiments of the present disclosure.

Figure 12:
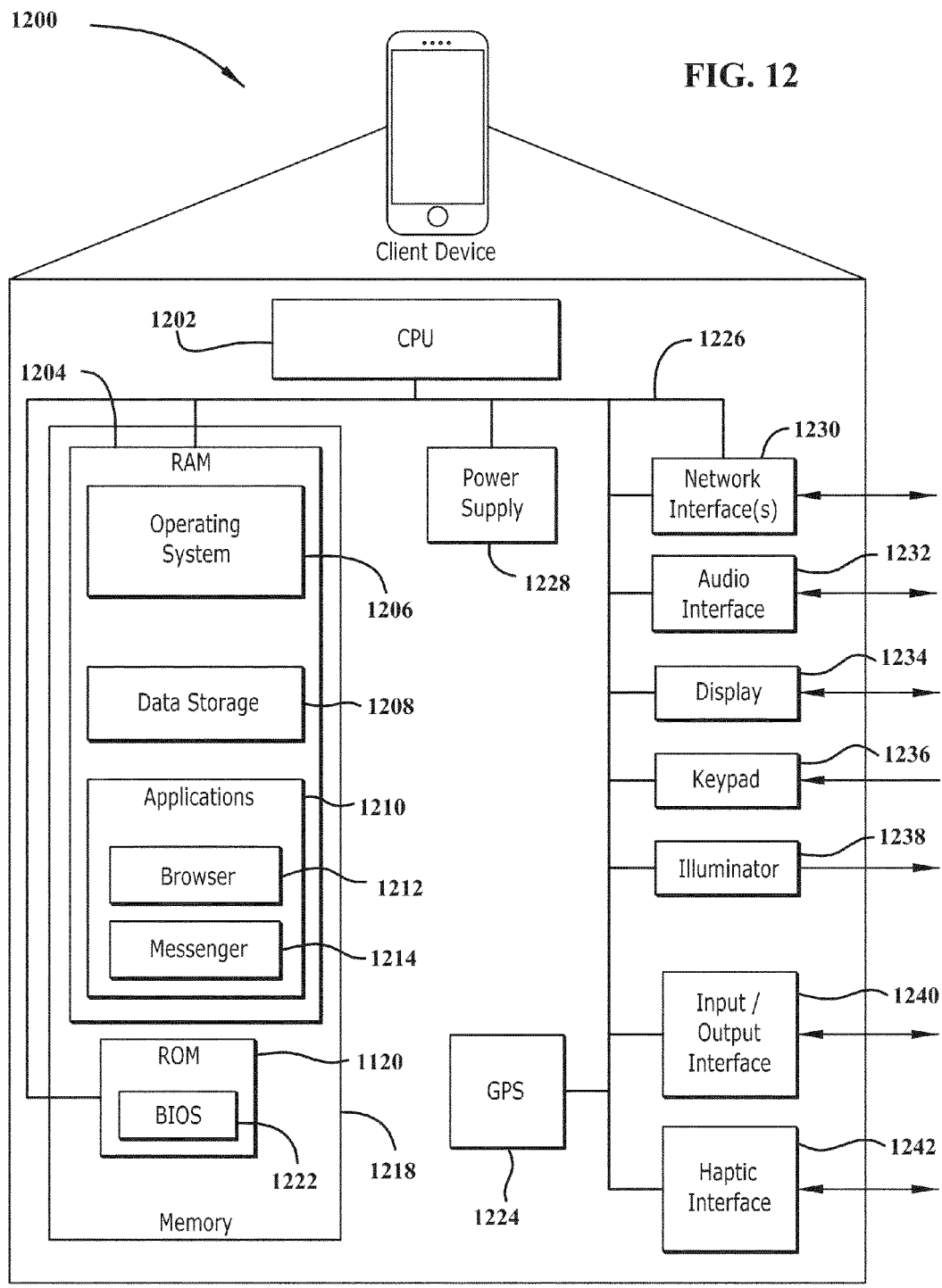
FIG. 12 is a schematic diagram illustrating a client device implementation of a computing device in accordance with embodiments of the present disclosure.

FIG. 12 is a schematic diagram illustrating a client device implementation of a computing device in accordance with embodiments of the present disclosure. A client device 1200 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1202, power supply 1228, a memory 1218, ROM 1220, BIOS 1222, network interface(s) 1230, audio interface 1232, display 1234, keypad 1236, illuminator 1238, I/O interface 1240 interconnected via circuitry 1226. Claimed subject matter is intended to cover a wide range of potential variations. For example, the keypad 1236 of a cell phone may include a numeric keypad or a display 1234 of limited functionality, such as a monochrome liquid crystal display (LCD) for displaying text. In contrast, however, as another example, a web-enabled client device 1200 may include one or more physical or virtual keyboards 1236, mass storage, one or more accelerometers, one or more gyroscopes, global positioning system (GPS) 1224 or other location identifying type capability, Haptic interface 1242, or a display with a high degree of functionality, such as a touch-sensitive color 2D or 3D display, for example. The memory 1218 can include Random Access Memory 1204 including an area for data storage 1208.

A client device 1200 may include or may execute a variety of operating systems 1206, including a personal computer operating system, such as a Windows, iOS or Linux, or a mobile operating system, such as iOS, Android, or Windows Mobile, or the like. A client device 1200 may include or may execute a variety of possible applications 1210, such as a client software application 1214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1200 may also include or execute an application to communicate content, such as, for example, textual content, multimedia content, or the like. A client device 1200 may also include or execute an application 1212 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, by a processor, an email message addressed to an email account;
receiving, by the processor, a user request for display of the received email message;
configuring, by the processor, the display of the received email message to comprise at least one user interface element that facilitates a user to request for other messages in the email account that are contextually relevant to the received email message;
transmitting, by the processor, the received email message and the user interface element for display to the user;
receiving, by the processor, a user activation of the user interface element;
identifying, by the processor, at least one message in the user's email account that is contextually relevant to the received email message, comprising:
constructing, by the processor, vectors representing the received email message and each of the other messages in the email account from the weights of relevant keywords extracted from the received message;
ranking, by the processor, the plurality of clusters in a descending order of relevance based on respective ones of the relevant keywords associated with each of the plurality of clusters;
selecting, by the processor, from the plurality of ranked clusters, a first ranked cluster as most relevant to the received email message; and
ranking, by the processor, messages within the first ranked cluster based on respective similarities to the received message;
automatically recommending, by the processor, search terms other than the relevant keywords, that are relevant to the received email message; and
transmitting, by the processor, the at least one other contextually relevant message for display to the user.

2. The method of claim 1, wherein receiving the user activation of the user interface element further comprises:
receiving, by the processor, a tap on the user interface element.

3. The method of claim 1, wherein receiving the user activation of the user interface element further comprises:
receiving, by the processor, a click on the user interface element.

4. The method of claim 1, wherein the other relevant message comprises at least one message from a different thread than a thread comprising the received email message.

5. The method of claim 1, and further comprising:
facilitating, by the processor, batch operations on the received email message and a plurality of other contextually relevant messages wherein the at least one contextually relevant message includes the plurality of other contextually relevant messages.

6. The method of claim 1, identifying the plurality of other contextually relevant messages further comprises:
analyzing, by the processor, the received email message;
extracting, by the processor, the relevant keywords from the received email message.

7. The method of claim 6, further comprises:
obtaining, by the processor, other messages from the email account that also include the relevant keywords; and
determining, by the processor, similarity between the received email message and the other messages to identify the other similar messages.

8. The method of claim 7, wherein the similarity is determined by cosine similarity.

9. The method of claim 7, further comprising:
clustering, by the processor, the other similar messages into a plurality of clusters based on the relevant keywords comprised within each of the other similar messages.

10. The method of claim 1 wherein the relevant keywords are named entities comprised within the received email.

11. A computing system comprising:
at least one processor;
a storage medium for tangibly storing thereon program logic for execution by the processor, the program logic comprising:
message receiving logic, executed by the processor, for receiving an email message addressed to an email account;
display request receiving logic, executed by the processor, for receiving a user request for display of the received email message;
display configuring logic, executed by the processor, for configuring the display of the received email message to comprise at least one user interface element that facilitates a user to request for other messages in the email account that are contextually relevant to the received email message;
user interface transmitting logic, executed by the processor, for transmitting the received email message and the user interface element for display to the user;

element activation receiving logic, executed by the processor, for receiving a user activation of the user interface element;

identifying logic, executed by the processor, for identifying other messages in the user's email account that are contextually relevant to the received email message, comprising:

constructing vectors representing the received email message and each of the other messages in the email account from the weights of relevant keywords extracted from the received message;

ranking the plurality of clusters in a descending order of relevance based on respective ones of the relevant keywords associated with each of the plurality of clusters;

selecting from the plurality of ranked clusters, a first ranked cluster as most relevant to the received email message; and ranking messages within the first ranked cluster based on respective similarities to the received message;

term recommending logic, executed by the processor, for transmitting to the user, search terms other than the relevant keywords, that are relevant to the received email message; and message transmitting logic, executed by the processor, for transmitting the other contextually relevant messages for display to the user.

12. The system of claim 11, the identifying logic further comprises:

analyzing logic, executed by the processor, for analyzing the received email message;

extracting logic, executed by the processor, for extracting the relevant keywords from the received email message.

13. The system of claim 12, the identifying logic further comprises:

obtaining logic, executed by the processor, for obtaining other messages from the email account that also include the relevant keywords; and determining logic, executed by the processor, for determining similarity between the received email message and the other messages to identify the other similar messages.

14. The system of claim 13, the identifying logic further comprises:

clustering logic, executed by the processor, for clustering the other similar messages and the received email message into a plurality of clusters based on the relevant keywords comprised within each of the other similar messages and the received email;

message selecting logic, executed by the processor, for selecting top 'A' messages of the first ranked cluster as the other contextually relevant messages, wherein A is a natural number.

15. A non-transitory computer readable storage medium, comprising instructions, which when executed by a processor cause the processor to:

receive an email message addressed to an email account;

receive a user request for display of the received email message;

configure the display of the received email message to comprise at least one user interface element that facilitates a user to request for other messages in the email account that are contextually relevant to the received email message;

transmit the received email message and the user interface element for display to the user;

receive a user activation of the user interface element;

identify at least one other message in the user's email account that is contextually relevant to the received email message, comprising:

construct vectors representing the received email message and each of the other messages in the email account from the weights of relevant keywords extracted from the received message;

rank the plurality of clusters in a descending order of relevance based on respective ones of the relevant keywords associated with each of the plurality of clusters;

select from the plurality of ranked clusters, a first ranked cluster as most relevant to the received email message; and rank messages within the first ranked cluster based on respective similarities to the received message;

transmit to the user, search terms other than the relevant keywords, that are relevant to the received email message; and transmit the at least one other contextually relevant message for display to the user.

16. The non-transitory computer readable medium of claim 15, wherein the instructions for identifying the at least one other message further comprise instructions that cause the processor to:

obtain other messages from the email account that also include the relevant keywords; and determine similarity between the received email message and the other messages to identify other similar messages.

17. The non-transitory computer readable medium of claim 16, wherein the instructions for identifying other messages further comprise instructions that cause the processor to:

cluster the other similar messages and the received email into a plurality of clusters based on the relevant keywords comprised within each of the other similar messages and the received email message; and select top 'A' messages of the first ranked cluster as the at least one other contextually relevant message, wherein A is a natural number.

* * * * *